(12) United States Patent
Fujimoto

(10) Patent No.: US 7,573,679 B2
(45) Date of Patent: Aug. 11, 2009

(54) MAGNETIC HEAD SUSPENSION

(75) Inventor: Yasuo Fujimoto, Kyoto (JP)

(73) Assignee: Suncall Corporation (JP)

( * ) Notice: Subject to any disclaimer, the term of this patent is extended or adjusted under 35 U.S.C. 154(b) by 155 days.

(21) Appl. No.: 11/688,693

(22) Filed: Mar. 20, 2007

(65) Prior Publication Data

US 2007/0177307 A1 Aug. 2, 2007

Related U.S. Application Data

(63) Continuation of application No. 10/753,463, filed on Jan. 9, 2004, now abandoned.

(30) Foreign Application Priority Data

Jan. 14, 2003 (JP) ............................. 2003-006077

(51) Int. Cl.
*G11B 5/48* (2006.01)
(52) U.S. Cl. .................................. 360/244.2
(58) Field of Classification Search ............. 360/244.2, 360/244.8, 245, 245.7; 29/603.03
See application file for complete search history.

(56) References Cited

U.S. PATENT DOCUMENTS

| | | | |
|---|---|---|---|
| 3,931,641 A | 1/1976 | Watrous | |
| 4,167,765 A | 9/1979 | Watrous | |
| 6,243,235 B1 * | 6/2001 | Fu et al. ................. | 360/245.7 |
| 6,462,910 B1 | 10/2002 | Shimizu et al. | |
| 6,556,382 B1 | 4/2003 | Tangren | |
| 6,735,050 B2 | 5/2004 | Takagi et al. | |
| 6,771,469 B2 | 8/2004 | Lindrose | |
| 6,798,618 B2 | 9/2004 | Takagi et al. | |
| 6,938,326 B1 * | 9/2005 | Chen et al. ............... | 29/603.03 |
| RE40,203 E * | 4/2008 | Hatch et al. ................. | 360/245 |
| 2001/0008475 A1* | 7/2001 | Takagi et al. ............. | 360/244.8 |
| 2001/0048574 A1 | 12/2001 | Bhattacharya et al. | |
| 2003/0039074 A1* | 2/2003 | Erpelding ................. | 360/244.2 |
| 2003/0193752 A1 | 10/2003 | Takahashi et al. | |
| 2004/0095681 A1 | 5/2004 | Takasugi et al. | |
| 2004/0150918 A1 | 8/2004 | Murakami et al. | |
| 2005/0201014 A1 | 9/2005 | Fujimoto et al. | |
| 2005/0237670 A1 | 10/2005 | Fujimoto et al. | |

FOREIGN PATENT DOCUMENTS

| | | |
|---|---|---|
| JP | 58-22827 B2 | 5/1983 |
| JP | 62-279570 | 12/1987 |
| JP | 01-303681 | 12/1989 |
| JP | 10-198937 | 7/1998 |
| JP | 11-086479 | 3/1999 |
| JP | 2001-155458 | 6/2001 |
| JP | 2003-059223 | 2/2003 |

* cited by examiner

*Primary Examiner*—Tianjie Chen
(74) *Attorney, Agent, or Firm*—Sterne, Kessler, Goldstein & Fox P.L.L.C.

(57) ABSTRACT

A magnetic head suspension of the present invention includes a flexure having a magnetic head mounting region, a load beam connected to the flexure and having a dimple at a portion corresponding to the magnetic head mounting region a load-bent portion generating a load for pressing a magnetic head to a magnetic disk via the load beam, and a base portion connected to a rear region of the load-bent portion. The load beam has a reinforcing structure that is symmetrical as viewed from the above based on a center longitudinal axis line, only in a center region in a longitudinal direction from a rearmost portion at the rear region to the dimple.

9 Claims, 5 Drawing Sheets

MAGNETIC HEAD SUSPENSION

CROSS-REFERENCE TO RELATED APPLICATIONS

This non-provisional application is a Continuation of application Ser. No. 10/753,463, filed on Jan. 9, 2004 which claims priority from Japanese Patent Application No.: 2003-006077, filed on Jan. 14, 2003, the content of which is incorporated herein by reference.

BACKGROUND OF THE INVENTION

1. Field of the Invention

The present invention relates to a suspension for supporting a magnetic head used in a hard disk drive.

2. Discussion of the Background

A magnetic head suspension needs to have an increased resonance frequency in a torsion mode and a bending mode, in order to accurately position a magnetic head on a target track by moving the magnetic head in a seek direction at a high speed.

Conventionally, it has been proposed to improve the torsion mode and the bending mode by bending the external edge and/or the internal edge of a load beam over the whole region in a longitudinal direction thereby to form a flange, as disclosed in Japanese Examined Patent Publication No. 58-22827 (1983) and U.S. Pat. No. 3,931,641.

However, the magnetic head suspensions described in those cited references are insufficient in the following points.

The magnetic head suspensions described in the patent literature have a flange formed over the whole longitudinal direction of a load beam. With this structure, the torsional rigidity and the bending rigidity of the load beam are improved, but the flange extending the whole longitudinal direction brings about an increase in the mass of the load beam.

This increase in the mass lowers the resonance frequency in the torsion mode and the bending mode of the suspension.

Further, the increase in the mass deteriorates the shock resistance performance of the suspension. In other words, when the mass of the load beam increases, controlling acceleration of the suspension caused by shock is more difficult, which can result in damage to the disk surface due to a backlash of the load beam.

SUMMARY OF THE INVENTION

The present invention is made in the light of the above conventional technical problems. It is an object of the present invention to provide a magnetic head suspension that can increase the resonance frequency in the torsion mode and/or the bending mode, by improving the rigidity of a load beam while suppressing the increase in the mass.

To achieve the above object, there is provided a magnetic head suspension including a flexure having a magnetic head mounting region, a load beam connected to the flexure, and a dimple at a portion corresponding to the magnetic head mounting region, a load-bent portion generating a load for pressing a magnetic head to a magnetic disk via the load beam, and a base portion connected to a rear region of the load-bent portion. The load beam has a reinforcing structure that is symmetrical as viewed from above, and, with reference to a center longitudinal axis line, is located only in a center region in a longitudinal direction from a rearmost portion at the rear region to the dimple.

According to the magnetic head suspension of the present invention, the load beam has a reinforcing structure that is symmetrical as viewed from the above with reference to the center longitudinal axis line X, only in the center region in the longitudinal direction from the rearmost portion of the load beam to the dimple. Therefore, the rigidity can be improved while suppressing the increase in mass as far as possible. Consequently, vibration in the torsion mode and/or the bending mode can be effectively reduced.

Preferably, the load beam has a longitudinal length L from the rearmost portion to the dimple, and the reinforcing structure is provided within a range of ±0.25 L from a longitudinal center position located at L/2 from the rearmost portion.

More preferably, the longitudinal length of the reinforcing structure is 0.04 to 0.4 L.

According to an aspect of the present invention, the reinforcing structure is the form of a flange structure provided at left and right symmetrical external sides of the load beam.

According to another aspect of the present invention, the load beam has a hollow opening, and the reinforcing structure is the form of a flange structure provided at left and right symmetrical internal sides defining the hollow opening.

According to still another aspect of the present invention, the reinforcing structure is in the form of a drawing structure formed on the load beam.

Preferably, the load beam includes a rear region connected to a front region of the load-bent portion, an intermediate region extending from the rear region toward the distal end, and a front region extending from the intermediate region toward the distal end and reaching the magnetic head mounting region. The rear region has a rear short beam extending along a width direction, and a pair of rear beams extending from both ends of the rear short beam to the distal end of the load beam and inclined toward the distal end of the load beam so as to come close to the center longitudinal axis line of the load beam. The intermediate region has a pair of intermediate side beams extending from the distal end of the pair of rear beams to the distal end of the load beam and inclined to be in parallel with the center longitudinal axis line of the load beam or inclined toward the distal end of the load beam so as to come close to the center longitudinal axis line of the load beam. The rear beam has an angle of inclination to the center longitudinal axis line of the load beam larger than that of the intermediate side beam.

BRIEF DESCRIPTION OF THE DRAWINGS

The above, and other objects, features and advantages of the present invention will become apparent from the detailed description thereof in conjunction with the accompanying drawings.

DETAILED DESCRIPTION OF THE EMBODIMENTS

Embodiment 1

Figure 1:
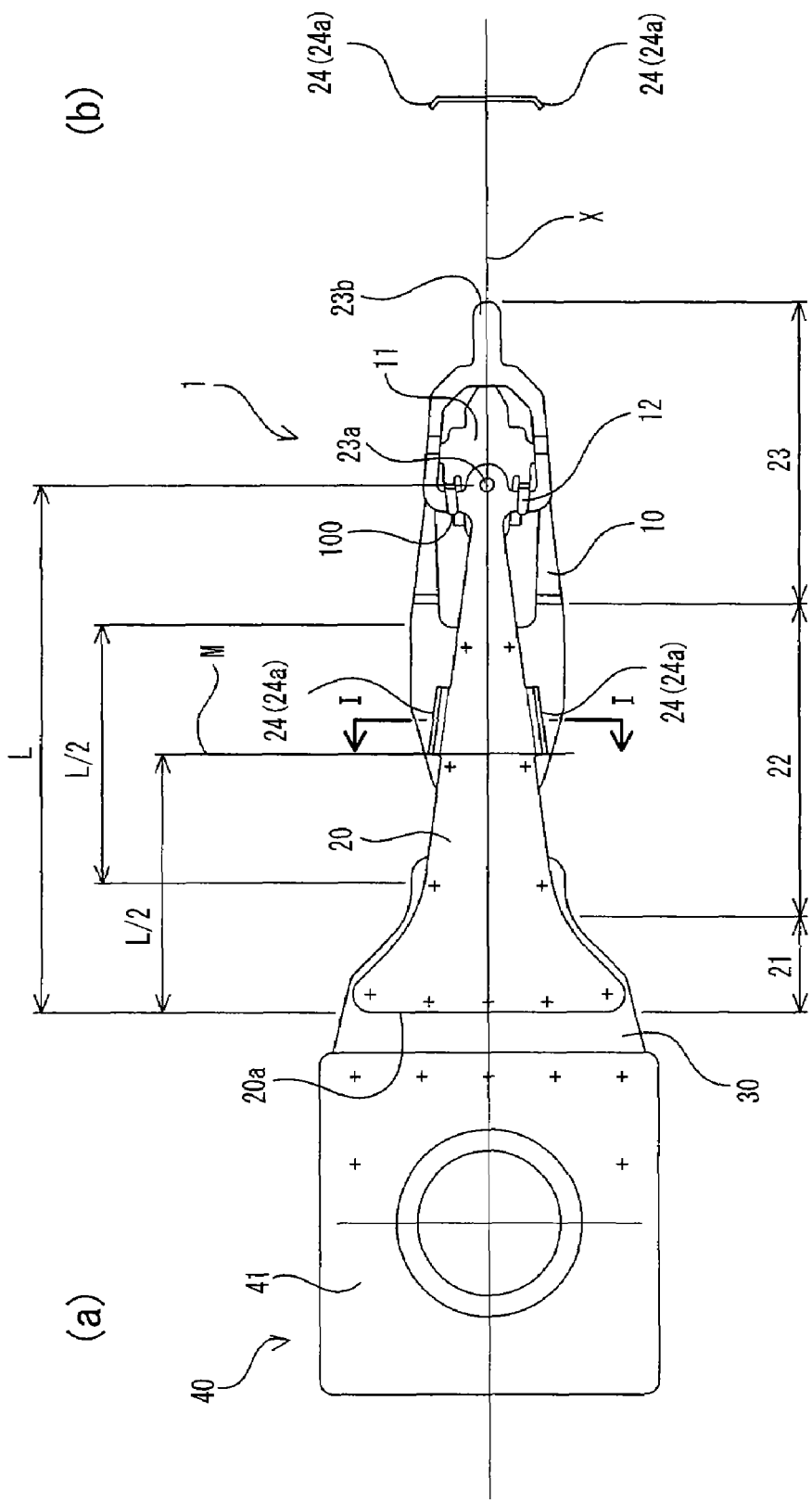
FIG. 1(a) is a top view of a magnetic head suspension according to a first embodiment of the present invention, as viewed from the opposite side of a disk surface.
FIG. 1(b) is a cross section taken along the line I-I in FIG. 1(a).

A first embodiment of a magnetic head suspension according to the present invention will be hereinafter described with reference to the accompanying drawings.

FIG. 1(a) is a top view of a magnetic head suspension 1 according to this embodiment, as viewed from the opposite side of a disk surface, and FIG. 1(b) is a cross section taken along the line I-I in FIG. 1(a). In the Figures, "+" marks represent welding points.

The magnetic head suspension 1 according to this embodiment includes: a flexure 10 which has a magnetic head mounting region 11 for supporting a magnetic head slider 100; a load beam 20 which is connected to the flexure 10; a load-bent portion 30 of which front region is connected to the load beam 20 and which generates a load for pressing the magnetic head slider 100 to a magnetic disk; and a base portion 40 which is connected to a rear region of the load-bent portion 30.

The flexure 10 is formed from a stainless-steel plate having a thickness of 15 to 25 μm, for example, and is joined to the load beam 20 by welding or the like.

The load beam 20 is formed from a stainless-steel plate having a thickness of 30 to 200 μm, for example. The load beam 20 transmits the magnetic head pressing load generated by the load-bent portion 30 to the flexure 10, moves the magnetic head slider 100 in a seek direction, and positions the magnetic head slider 100 at a target track. Details of the load beam 20 will be described later.

The load-bent portion 30 functions as a blade spring for pressing the magnetic head slider 100 to the magnetic disk against the pressure of air layer generated between the magnetic head slider 100 and the surface of the magnetic disk caused by rotation of the magnetic disk, thereby generating the magnetic head pressing load for securing a constant flying space of the magnetic head slider 100.

In this embodiment, a member forming the load-bent portion 30 and a member forming the flexure 10 are separated; however, these portions may also be formed integrally.

The base portion 40 is designed to be able to support an assembly consisting of the flexure 10, the load beam 20 and the load-bent portion 30 and to transmit driving force from an actuator to the assembly.

In this embodiment, the base portion 40 is the form of a mount 41 fitted to an E block by caulking. The mount 41 is formed from a stainless-steel plate having a thickness of 0.1 to 0.4 mm, for example.

The load-bent portion 30 is connected to the base portion 40, and the rear region 21 of the load beam 20 is connected to the load-bent portion 30.

In this embodiment, the mount 41 is provided as the base portion; however, it is of course possible to use an arm fitted to the bearing of a voice coil motor, in place of the mount 41.

Herein, the load beam 20 will be described in detail.

In this embodiment, the load beam 20 includes: the rear region 21 positioned at the rearmost side and connected to the load-bent portion 30; an intermediate region 22 extending from the rear region 21 toward the distal end; and a front region 23 extending from the intermediate region 22 toward the distal end and reaching the magnetic head mounting region 11.

A dimple 23a protruding in a flexure direction is provided in the front region 23 of the load beam 20. The magnetic head pressing load works on the flexure 10 and the magnetic head slider 100 via the dimple 23a. Based on this structure, the magnetic head slider 100 flexibly moves in a pitch direction and a roll direction around the top of the dimple 23a.

In FIG. 1, a reference character 23b represents a lift tab provided in the front region 23 of the load beam 20. The lift tab 23b is a member brought into contact with an inclined surface referred to as a ramp (not shown) at the time of unloading the magnetic head slider 100 from the magnetic disk (i.e., moving the magnetic head slider 100 outward in a radial direction of the magnetic disk, and separating it from the magnetic disk surface). In other words, when the lift tab 23b of the load beam 20 is brought into contact with the ramp and the load beam 20 moves upward, a hook 12 of the flexure 10 hangs on the load beam 20. Accordingly, the magnetic head slider 100 is separated from the magnetic disk.

The load beam 20 having the above structure has a reinforcing structure 24 that is symmetrical as viewed from the above based on a center longitudinal axis line X, and is located only in a center region in a longitudinal direction from a rearmost portion 20a at the rearmost side to the dimple 23a.

More specifically, when a longitudinal length from the rearmost portion 20a to the dimple 23a is expressed as L, the reinforcing structure 24 is provided within a range of ±0.25 L from a longitudinal center position M located at L/2 from the rearmost portion 20a.

Preferably, the longitudinal length of the reinforcing structure 24 is 0.04 to 0.4 L.

In this embodiment, the flange structure 24a provided at the left and right external sides of the load beam 20 is employed as the reinforcing structure 24 as shown in FIG. 1(b); however, the present invention is not limited to this structure.

Figure 2:
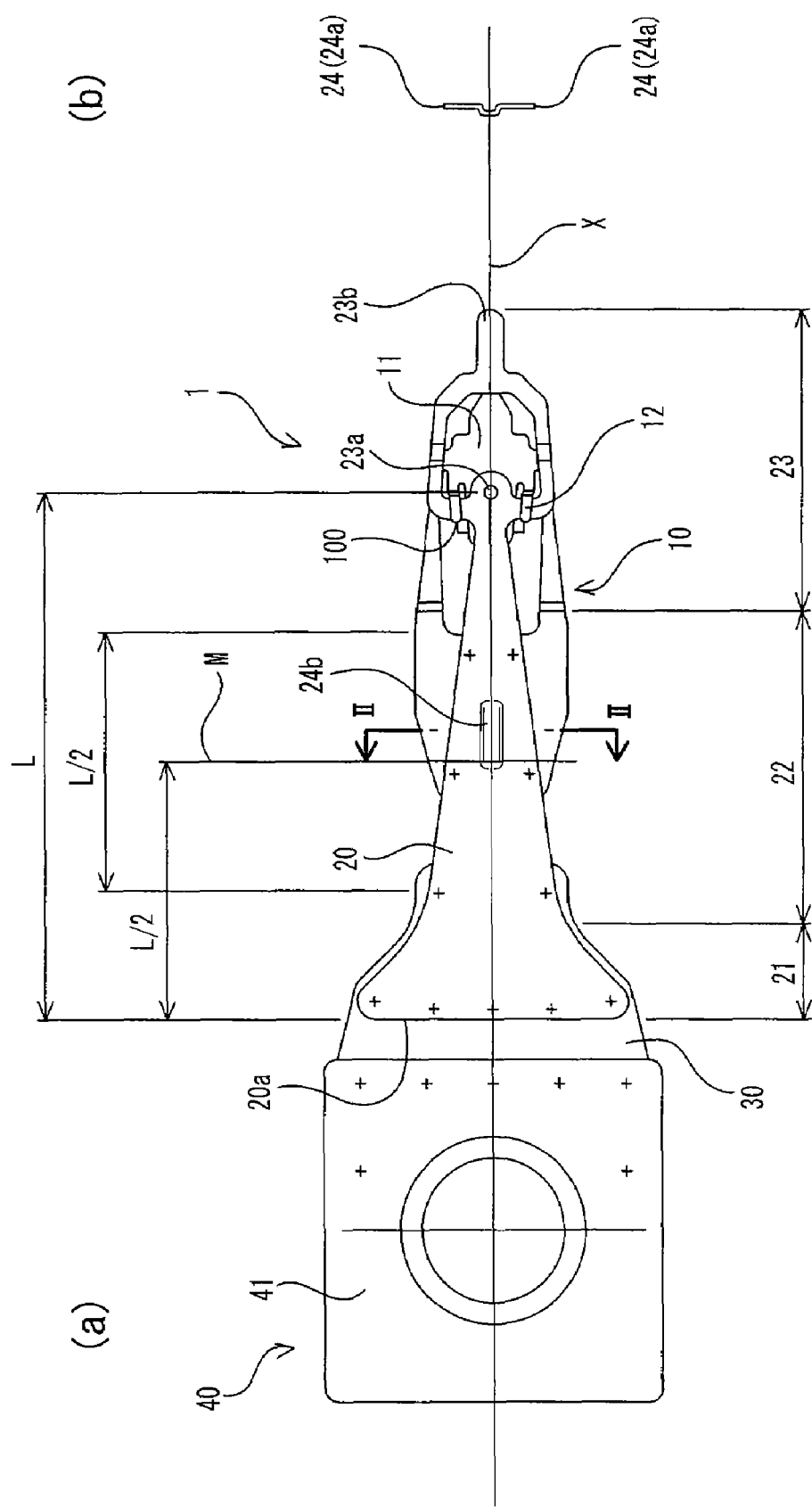
FIG. 2(a) is a top view of a modification of the magnetic head suspension according to the first embodiment, as viewed from the opposite side of the disk surface.
FIG. 2(b) is a cross section taken along the line II-II in FIG. 2(a).

For example, a drawing structure 24b formed on the load beam 20 as shown in FIG. 2(b) may also be employed as the reinforcing structure.

Figure 3:
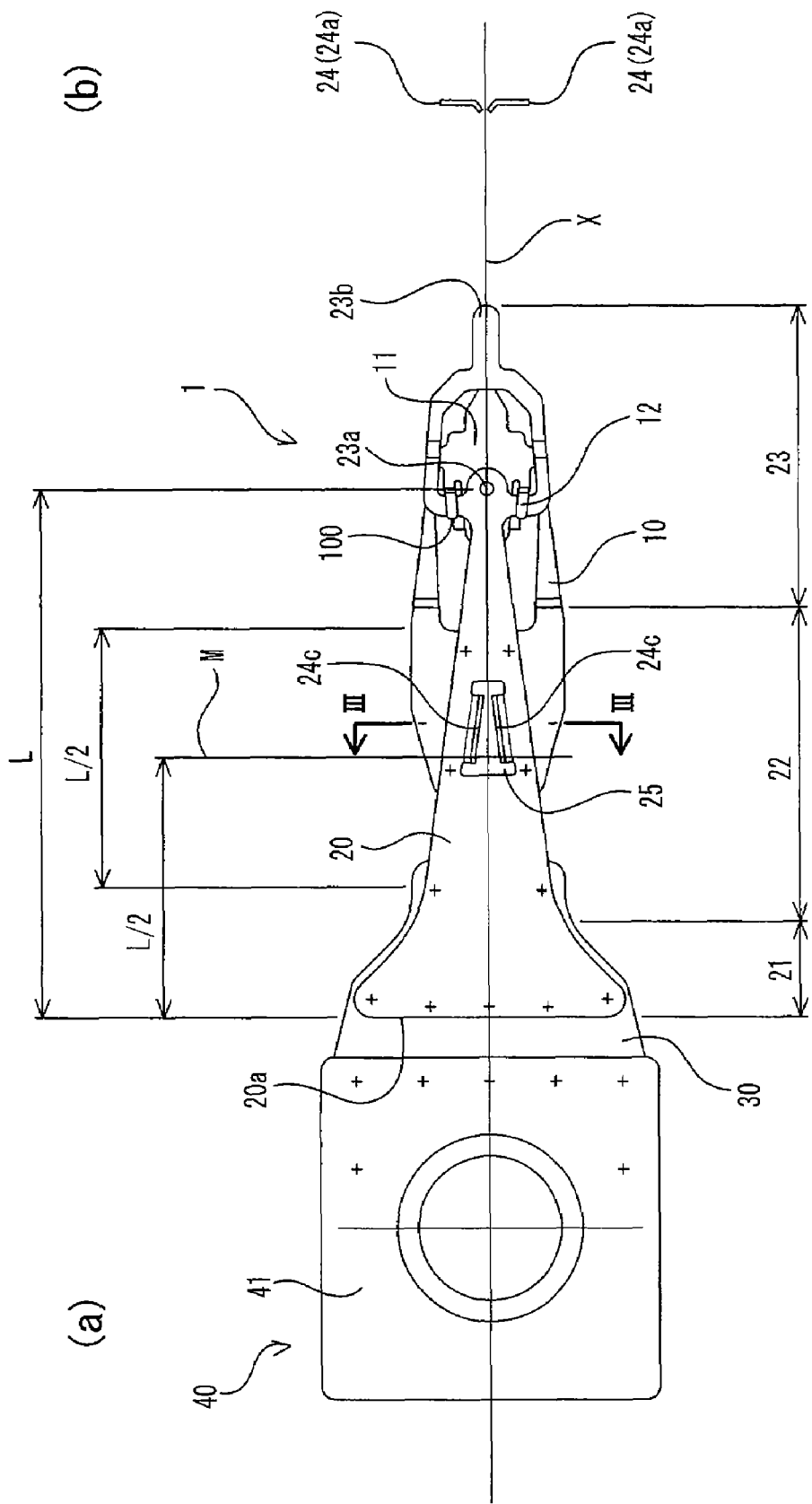
FIG. 3(a) is a top view of another modification of the magnetic head suspension according to the first embodiment, as viewed from the opposite side of the disk surface.
FIG. 3(b) is a cross section taken along the line III-III in FIG. 3(a).

Further, as shown in FIG. 3(b), when the load beam 20 forms a hollow opening 25 thereon, a flange structure 24c formed by bending a pair of internal edges defining the opening 25 may also be employed as the reinforcing structure 24.

As described above, in this embodiment, in the load beam 20, the reinforcing structure 24 that is symmetrical as viewed from the above based on the center longitudinal axis line X is provided only in the center region in the longitudinal direction from the rearmost portion 20a to the dimple 23a. Therefore, the following effects can be obtained.

Considering the bending mode characteristics of the load beam 20, the load beam 20 causes vibration between the rearmost portion 20a and the dimple 23a. Therefore, the bending mode of the load beam 20 has a peak (an abdominal area) at an intermediate portion between the rearmost portion 20a and the dimple 23a in the longitudinal direction.

Consequently, when the reinforcing structure 24 is provided only in the center region in the longitudinal direction from the rearmost portion 20a to the dimple 23a, the vibration of the load beam 20 in the bending mode can be effectively reduced while suppressing the increase in the mass of the load beam 20 as far as possible.

The reinforcing structure 24 may be in a single structure as shown in FIG. 2(b) as long as the reinforcing structure 24 has a symmetrical structure based on the center longitudinal axis line.

Alternatively, the reinforcing structure 24 may be in a multiple structure as shown in FIGS. 1(b) and 3(b). The multiple structure of course includes a two-paired structure and others in addition to a paired structure as shown in FIGS. 1(b) and 3(b).

Further, in this embodiment, the load beam 20 has a triangular shape as viewed from the above so as to have a narrow width from the rear side toward the distal end. The angle of inclination from the external edge of the rear region 21 to the center longitudinal axis line X is larger than the angle of inclination from the external edge of the of the intermediate region 22 to the center longitudinal axis line X.

According to the above structure, the moment of inertia around the center longitudinal axis line X of the load beam 20 can be suppressed. Therefore, the resonance frequency in the torsion mode of the magnetic head suspension as a whole can be increased.

Consequently, the magnetic head slider 100 can be moved more accurately in the seek direction at a high speed.

Embodiment 2

A second embodiment of a magnetic head suspension 1' according to the present invention will be hereinafter described with reference to the accompanying drawings.

Figure 4:
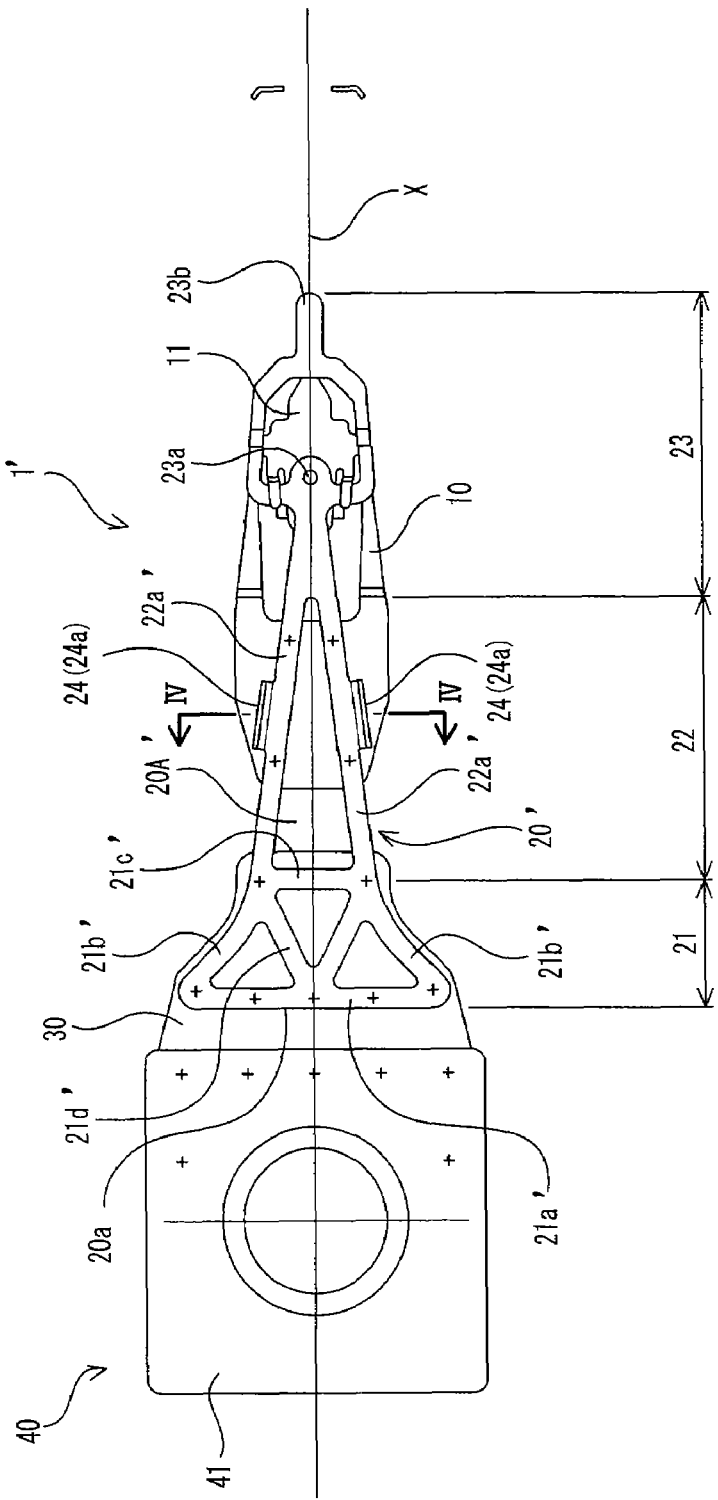
FIG. 4(a) is a top view of a magnetic head suspension according to a second embodiment of the present invention, as viewed from the opposite side of a disk surface.
FIG. 4(b) is a cross section taken along the line IV-IV in FIG. 4(a).

FIG. 4(a) is a top view of the magnetic head suspension 1' according to this embodiment, as viewed from the opposite side of a disk surface. FIG. 4(b) is a cross section taken along the line IV-IV in FIG. 4(a).

In this embodiment, corresponding or identical parts to those of the first embodiment have been given the same reference characters to omit a detailed description thereof.

As shown in FIG. 4(b), the magnetic head suspension 1' according to this embodiment includes a hollow beam-shaped load beam 20', in place of the solid plate load beam 20 in the magnetic head suspension 1 according to the first embodiment.

More specifically, the load beam 20' has a rear short beam 21a' extending in a width direction of the load beam 20', and a pair of rear side beams 21b' extending to the distal end of the load beam 20' from both ends of the rear short beam 21a', in the rear region 21.

The rear short beam 21a' has a width of 0.2 to 0.4 mm, for example.

The pair of rear side beams 21b' are inclined to come close to the center longitudinal axis line X of the load beam 20' toward the distal end of the load beam 20'. The pair of rear side beams 21b' have respectively a width of 0.2 to 0.4 mm, for example.

Preferably, the load beam 20' further has: a reinforcing short beam 21c' extending in a width direction so as to connect between the pair of rear side beams 21b'; and a pair of reinforcing inclined beams 21d' connecting between each of the pair of rear side beams 21b' and the center of the rear short beam 21a', in the rear region 21.

More preferably, the reinforcing short beam 21c' is disposed to extend between the distal ends of the pair of rear side beams 21b'.

Preferably, the pair of reinforcing inclined beams 21d' are disposed to extend between the distal end of the pair of rear side beams 21b' and the center of the rear short beam 21a'.

Provision of the reinforcing short beam 21c' and the pair of reinforcing inclined beams 21d' can improve the torsional rigidity and the rigidity in the lateral direction of the magnetic head suspension 1'.

Either only one of the reinforcing short beam 21c' and the pair of reinforcing inclined beams 21d' can be provided.

The load beam 20' has a pair of intermediate side beams 22a' extending from the distal end of the pair of rear side beams 21b' to the distal end of the load beam 20', in the intermediate region 22.

In other words, in this embodiment, the region of the load beam 20', which is encircled by the rear short beam 21a', the pair of rear side beams 21b' and the pair of intermediate side beams 22a', is formed in a hollow shape as an opening 20A'. With this structure, reduction in the mass of the load beam 20' is attempted.

The pair of intermediate side beams 22a' are inclined to come close to the center longitudinal axis line X of the load beam 20' toward the distal end of the load beam 20'. The pair of rear intermediate side beams 22a' have respectively a width of 0.2 to 0.4 mm, for example.

The load beam 20' has the reinforcing structure 24 only in the center region in the longitudinal direction between the rearmost portion 20a and the dimple 23a, like in the first embodiment.

Figure 5:
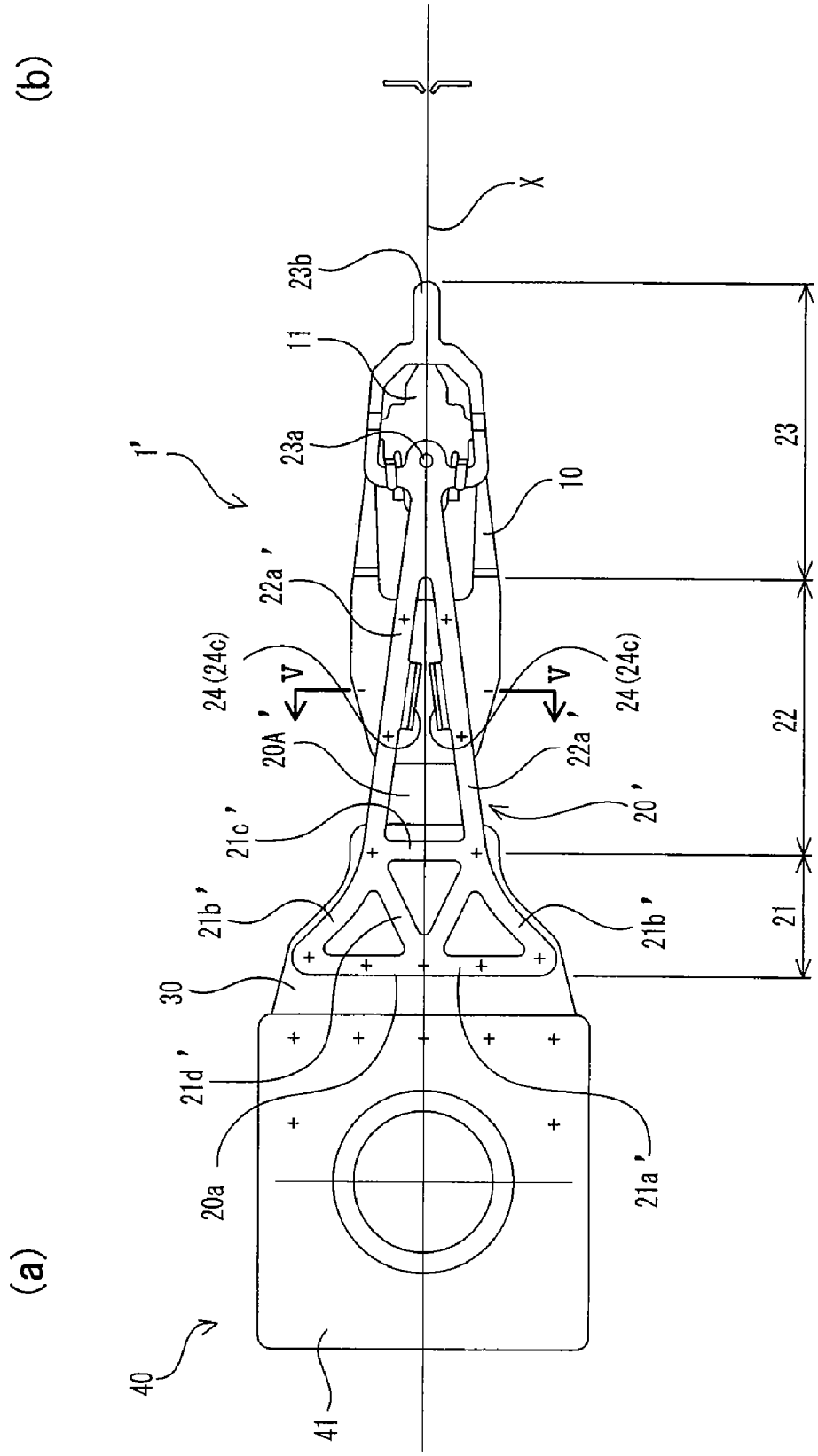
FIG. 5(a) is a top view of a modification of the magnetic head suspension according to the second embodiment, as viewed from the opposite side of the disk surface.
FIG. 5(b) is a cross section taken along the line V-V in FIG. 5(a).

The reinforcing structure 24 may be provided as a flange structure having the external edge of the load beam 20' bent as shown in FIG. 4(b). Alternatively, the reinforcing structure 24 may be provided as a flange structure having the internal edge of the load beam 20' bent as shown in FIG. 5(b).

As described above, in the magnetic head suspension 1' according to this embodiment, the rear region 21 of the load beam 20' consists of the rear short beam 21a' and the pair of rear side beams 21b'. The intermediate region 22 of the load beam 20' consists of the pair of intermediate side beams 22a'. The angle of inclination from the pair of rear side beams 21b' to the center longitudinal axis line X of the load beam is set larger than the angle of inclination from the pair of intermediate side beams 22a' to the center longitudinal axis line X of the load beam.

In the load beam 20 having the above structure, the mass can be reduced, and the moment of inertia around the center longitudinal axis line X can be reduced more than those according to the first embodiment.

Therefore, the magnetic head suspension 1' having the load beam 20' can further increase the resonance frequency in the torsion mode, in addition to obtaining the effect of the first embodiment. Consequently, the magnetic head slider 100 can be positioned with high precision.

In this embodiment, the pair of intermediate side beams 22a' of the load beam 20' are inclined to come close to the center longitudinal axis line X of the load beam 20' toward the distal end of the load beam 20'. In place of this, the pair of intermediate side beams 22a' can be set approximately parallel with the center longitudinal axis line X of the load beam 20'. In this replacement mode, the moment of inertia around the center longitudinal axis line X of the load beam 20' becomes slightly larger than that according to this embodiment. However, the moment of inertia around the center longitudinal axis line X of the load beam 20' can be reduced sufficiently from that of the conventional load beam.

In the respective embodiments, stainless-steel steel is used as a material to form the load beams 20 and 20'. Preferably, in place of this material, it is possible to use pure aluminum or alloy of aluminum and one or more metals such as Cu, Mg, Cr and Zn (A7075, etc.), or pure titanium or alloy of titanium and metal such as Mo, V, Zr, Cr and Al, or ceramics such as silicon nitride, silicon carbide, zirconium and aluminum. When the load beams 20 and 20' are formed using the above material, the load beams 20 and 20' can have lighter weight than a case where the load beams 20 and 20' are formed using stainless steel. As a result, the resonance frequency can be improved, and the shock resistance can be improved.

This specification is by no means intended to restrict the present invention to the preferred embodiments set forth therein. Various modifications to the magnetic head suspension, as described herein, may be made by those skilled in the art without departing from the spirit and scope of the present invention as defined in the appended claims.

What is claimed is:

1. A magnetic head suspension comprising:
   a flexure having a magnetic head mounting region;
   a load beam portion connected to said flexure and having a dimple at a portion corresponding to said magnetic head mounting region;
   a load-bent portion generating a load for pressing a magnetic head to a magnetic disk via said load beam portion, said load-bent portion being formed by a member separate from a member forming said load beam portion; and
   a base portion connected to a rear region of said load-bent portion, wherein
   said member forming said load beam portion has a reinforcing flange structure that is symmetrical as viewed from the above based on a center longitudinal axis line, only within a range of ±0.25 L from a longitudinal center position located at L/2 from a rearmost portion of the load beam portion provided that a longitudinal length from the rearmost portion of the load beam portion to the dimple is L, and has no reinforcing structure other than said reinforcing flange structure.

2. A magnetic head suspension as set forth in claim 1, in which
   said reinforcing flange structure is provided at left and right symmetrical external sides of said member forming said load beam portion.

3. A magnetic head suspension as set forth in claim 1, in which
   said member forming said load beam portion has a hollow opening, and
   said reinforcing flange structure is provided at left and right symmetrical internal sides of said member forming said load beam portion, said internal sides defining said hollow opening.

4. A magnetic head suspension comprising:
   a flexure having a magnetic head mounting region;
   a load beam portion connected to said flexure and having a dimple at a portion corresponding to said magnetic head mounting region;
   a load-bent portion generating a load for pressing a magnetic head to a magnetic disk via said load beam portion, said load-bent portion being formed by a member separate from a member forming said load beam portion; and
   a base portion connected to a rear region of said load-bent portion, wherein
   said member forming said load beam portion has a reinforcing drawing structure that is symmetrical as viewed from the above based on a center longitudinal axis line, only within a range of ±0.25 L from a longitudinal center position located at L/2 from a rearmost portion of the load beam portion provided that a longitudinal length from the rearmost portion of the load beam portion to the dimple is L, and has no reinforcing structure other than said reinforcing drawing structure.

5. A magnetic head suspension comprising:
   a flexure having a magnetic head mounting region;
   a load beam portion connected to said flexure and having a dimple at a portion corresponding to said magnetic head mounting region;
   a load-bent portion generating a load for pressing a magnetic head to a magnetic disk via said load beam portion, said load-bent portion being formed by a member separate from a member forming said load beam portion; and
   a base portion connected to a rear region of said load-bent portion, wherein
   said member forming said load beam portion includes a rear region connected to a front region of said load-bent portion, an intermediate region extending from the rear region toward the distal end, and a front region extending from the intermediate region toward the distal end and reaching said magnetic head mounting region;
   said rear region has a rear short beam extending along a width direction, and a pair of rear side beams extending from both ends of the rear short beam to the distal end of the load beam portion and inclined toward the distal end of the load beam portion so as to come close to the center longitudinal axis line of the load beam portion;
   said intermediate region has a pair of intermediate side beams extending from the distal end of said pair of rear beams to the distal end of the load beam portion and inclined to be in parallel with the center longitudinal axis line of the load beam portion or inclined toward the distal end of the load beam portion so as to come close to the center longitudinal axis line of the load beam portion, and
   said rear side beams have an angle of inclination to the center longitudinal axis line of the load beam portion larger than that of said intermediate side beams; and
   said member forming said load beam portion has a reinforcing structure that is symmetrical as viewed from the above based on a center longitudinal axis line, only in a center region in a longitudinal direction from a rearmost portion at the rear region to said dimple.

6. A magnetic head suspension as set forth in claim 5, in which
   said member forming said load beam portion has a longitudinal length L from said rearmost portion to said dimple, and
   said reinforcing structure is provided within a range of ±0.25 L from a longitudinal center position located at L/2 from said rearmost portion.

7. A magnetic head suspension as set forth in claim 6, in which the longitudinal length of said reinforcing structure is 0.04 to 0.4 L.

8. A magnetic head suspension as set forth in claim 5, in which
   said reinforcing structure is the form of a flange structure provided at left and right symmetrical external sides of said intermediate side beams.

9. A magnetic head suspension as set forth in claim 5, in which
   said reinforcing structure is the form of a flange structure provided at left and right symmetrical internal sides of said intermediate side beams.

* * * * *